United States Patent Office 3,013,307
Patented Dec. 19, 1961

3,013,307
NITRILE RUBBER PRODUCT AND PROCESS FOR MAKING THE SAME
George D. Rhoads, Redwood City, and Vasalie L. Peickii, Hillsborough, Calif., assignors to Federal-Mogul-Bower Bearings, Inc., Detroit, Mich., a corporation of Michigan
No Drawing. Filed Dec. 30, 1959, Ser. No. 862,751
5 Claims. (Cl. 18—53)

This invention relates to a method for increasing the abrasion resistance of elastomeric compositions. More particularly, this invention relates to a method of making cured butadiene-acrylonitrile elastomeric oil seals more resistant to the abrasive action of a rotating shaft. This invention also relates to the products produced by this method.

Nitrile elastomeric compositions, such as the Buna-type rubbers, possess sufficient resistance to heat, lubricating oils, oxygen, etc., for use as sealing members in oil retainers. However, many Bunas do not have very high abrasion resistance, a feature of great importance in oil seals. A common method of increasing the abrasion resistance of these elastomers is by incorporating a fibrous material, such as cotton flock, in the rubber composition; but this flock prevents formation of a sharp, straight-edged lip, so that a seal containing flock tends toward leakage and does not retain oil as well as one without flock.

One of the prominent uses of a nitrile oil seal is in the automobile industry, particularly at rear wheel bearings. A wheel bearing oil seal has a dual function, in that it must retain the lubricant on the bearing side and also act as a barrier on the other side preventing the entry of contaminants, including oxygen, ozone, and other airborne chemicals, as well as solid matter such as dust, dirt and the like. The surfaces on which these seals run usually are not ground to a perfectly smooth finish, and substantial abrasion of the seal lip occurs, materially shortening its length of service. Replacement of rear wheel oil seals is a time-consuming and costly procedure. Therefore, a satisfactory rear wheel bearing seal must be very resistant to abrasion, as well as to the other forces present in such a location.

The problem is aggravated when permanently sealed wheel bearings are used. On one side of such a bearing an oil seal isolates the bearing from the differential lubricant; the bearing relies totally on its own lubricant. Another seal, on the other side of the bearing, precludes entry of dust, dirt and other contaminants into the bearing proper. This latter seal does not contact the differential lubricant and therefore must run dry. Abrasion occurs at both seal positions, but is greatest where the seal runs dry. Substantially perfect seals are therefore needed at both positions in order to derive satisfactory service from the bearing.

When seals with abrasion-resistant flock were tried with these bearings, they did not retain the oil, due to their imperfect lip edges. When seals without flock were tried, they were not sufficiently abrasion-resistant to hold up for the lifetime of the bearing. Even when the shaft was experimentally polished to a very fine finish (a process far too costly for standard practice), there still existed enough rough surface to abrade the lip, causing sufficient wear in a relatively short period of time to destroy the effectiveness of the seal.

Other attempts to overcome the problem, including increasing the tension of the spring holding the lip of the seal in contact with the shaft, changing the design of the seal, and even changing lubricants, were unsuccessful.

An important object of the invention is the provision of an oil seal which will give satisfactory performance for extended periods of time, even when used under extreme conditions, such as on production rear axles of vehicles equipped with permanently sealed and lubricated wheel bearings.

Another object of the invention is to provide a nitrile-rubber composition which is usually high in abrasion-resistance and from which a sharp, straight sealing lip can be formed.

Still another important object of the invention is the provision of a new means for greatly enhancing the abrasion-resistance of conventionally cured and finished nitrile elastomers, including those used in oil seals.

In general, the process of the invention comprises subjecting oil seals made from nitrile-elastomeric compositions, which have been molded, press-cured, and otherwise finished into a seal ready for use, to a special heat treatment. The heating may be done in any suitably insulated container which will maintain a uniform temperature throughout the time of the treatment. One or many seals can be treated at once; in fact, production runs of 5,000 and more seals have been treated satisfactorily at the same time in the same insulated container. This process produces a seal which retains all of the beneficial properties present in the untreated seal, but which has an abrasion-resistance factor at least 100 percent and, in some instances, as great as 400 to 600 percent higher than that of the untreated seal. This treated oil seal, even when used on shafts which are uncommonly rough and thereby abrade seals at a greater rate, is sufficiently abrasion-resistant to serve as a satisfactory sealing member for longer periods of time than the finest seal heretofore available. In fact, this treatment increases the normal driving life of these oil seals from a 25,000 mile range to a 100,000 mile range.

This treatment is even the more unusual in that the results obtained thereby are, in fact, contra-indicated by virtue of the nature of the elastomer in the composition. The expected result of subjecting nitrile-type rubbers, such as Buna-N (containing butadiene-acrylonitrile copolymers), to the effects of elevated temperatures for such sustained periods of time, is a hard, brittle, easy-to-crack-and-split seal of no value, since the high percentage of unsaturation of the nitrile compounds indicates formation of weak oxygen linkages and a rapid hardening of the composition. However, this does not happen; rather, the seals treated by this new process still possess all the outstanding features of the untreated seal, plus greatly superior abrasion-resistance.

In carrying out the invention, a temperature of 350° F. is preferred, for in extensive testing this temperature has provided the most satisfactory results. However, other temperatures in the general range of 225° F. to 450° F. are operable, so long as they are combined with appropriate time periods and as long as they are used with proper controls. Even lower or higher temperatures may be used, but lower temperatures require much longer treatment periods and are not economical, whereas higher temperatures require exacting time controls to prevent burning, etc., of the rubber. The above range may, however, be varied to suit particular situations.

Satisfactory abrasion-resistant seals have been made by exposing the cured and otherwise finished (i.e., trimmed and de-flashed) seals to the effects of an elevated temperature for a period of from 3 to 7 hours; however, I have found that 4 to 6 hours at 350° F. is an optimum range and, depending upon the particular facility used for the treatment, that a 4- or 6-hour period gives highly satisfactory results.

The following examples are set forth to illustrate some preferred embodiments of this invention. No intention is present to limit the invention to these examples for, indeed, there are many other combinations of times and temperatures which will produce the outstanding and unexpected results flowing from this procedure.

*Example 1*

A composition comprising 100 parts nitrile rubber, 30 parts graphite, 45 parts carbon black (reinforcing), and no flock or other abrasion-resistant additive, was molded into a group of 1000 oil seals. These seals were then cured by the conventional Thiuran process well-known to those skilled in the art. The resulting seals were trimmed and finished, ready for installation.

A 6'x 6'x 6' insulated heating container that maintained the temperature at 350° F. within a maximum variation of ±4° F. was turned on, brought up to 350° F., and held there for about 10 minutes to stabilize the temperature. The seals were placed in glass-fiber-lined metal trays on a cart, and the cart placed in the container. The temperature immediately dropped below 350° F., but in about 40 minutes had risen again to 350° F., where it thereafter was maintained. Samples were removed from the container each half-hour and checked for hardness by a micro-durometer measuring instrument. After seven hours the seals were removed and permitted to cool to room temperature. Inspection of these seals showed that no cracking, no flex-breaks, or other undesirable results had occurred. They were harder and stiffer than before the treatment but became flexible when worked.

Four of these seven-hour treated seals were tested on a four-spindle drill press test unit containing 10 to 18 R.M.S. (root mean square) surface finish rear wheel bearing races mounted on shafts with an 0.020 TIR runout. The seals were subjected to an initial 4-hour dry run, followed by a 64-hour run in a ½ inch head of 90 weight gear lubricant. The r.p.m. of the shafts was varied between 260 and 1000 at a cycle of once each 2 minutes. The seals showed no measurable leakage at any time. At the end of the test, the seals were removed and examined. The maximum wear-pattern width on the lip edge was less than 0.005 inch, and no cracks or abrasions had occurred. A wear pattern of about 0.30 inch would be expected on an untreated seal subjected to the same test conditions.

*Example 2*

Four of the untreated seals of Example 1 were heated to 350° F. and maintained there for 6 hours, following the general procedure of Example 1. These treated seals were then mounted on the four-spindle test unit with 10 to 18 R.M.S. races and run first for 4 hours dry, then 99 hours with a ½ inch head of 90 weight gear lubricant, at a shaft runout of 0.023 inch.

No leakage was observed from any of the seals, and the maximum wear patterns varied from 0.005 to 0.015 inch. The expected wear pattern of an untreated seal, subjected to the same conditions, is about 0.060 inch.

*Example 3*

Four untreated seals from the Example 1 group were heat-treated at 350° F. for 6 hours according to the Example 1 procedure. These treated seals were installed on shafts having an 0.023 inch TIR runout and 10 to 18 R.M.S. races, run dry for 4 hours and then with a ½ inch head of 90 weight gear lubricant for an additional 105 hours. No leakage occurred, and the maximum wear pattern widths varied from 0.005 to 0.020 inch. A wear pattern width of around 0.060 inch would be expected on an untreated, but otherwise identified, seal subjected to the same conditions.

*Example 4*

Four cured and finished oil seals made from the same composition as in Example 1 were treated at a temperature of 350° F. for 4½ hours, using the same equipment as in Example 1. These seals then were subjected to a leakage-and-abrasion resistance test comprising first a run of 4 hours without lubricant, followed by a 129-hour run in a ½ inch head of 90 weight multigear lubricant. The test machine was the four-spindle unit of Example 1 fitted with 16 to 34 R.M.S. bearing races on shafts turning with a 0.020 TIR runout.

All seals completed the test without measurable leakage. The wear pattern widths varied from 0.015 inch on the 16 R.M.S. race to 0.030 inch on the 34 R.M.S. race. Expected wear pattern widths on similar untreated seals tested in the same manner would be four to six times as great.

*Example 5*

Cured and finished seals of the same type as in Example 1 were treated at 250° F. for 48 hours. These treated seals were compared with flock-containing, identical untreated seals as to sealing properties and abrasion resistance. The treated seals showed a wear pattern of approximately 0.030 inch in width, and retained lubricant without any leakage; whereas, the untreated seals were worn approximately 0.060 to 0.070 inch wide, and soon leaked substantially. This approximate 100% increase in abrasion-resistance of the treated seals over the untreated, flock-containing seals, illustrates the unexpected and highly beneficial results with a much different time-temperature combination.

*Example 6*

Cotton flock was added to the seal-composition of Example 1, and wheel bearing oil seals were made from the flock-containing mixture. These seals were cured and finished in the usual manner.

A portion of the seals then was subjected to a temperature of 350° F. for 4 hours, as per Example 1. After cooling, the treated seals were tested for abrasion-resistance. The results showed that these treated seals were approximately six times as resistant as the untreated seals made from the same material.

*Example 7*

Four of the treated seals of Example 1 were tested with 13 to 22 R.M.S. inner races in the four-spindle test unit of Example 1 for 794 continuous hours at 0.003 TIR shaft runout. The entire test was conducted with the seals operating in a ½ inch head of 90 weight gear lubricant. At the end of the test, all the seals had no measurable leakage and the maximum wear-pattern width varied from 0.005 inch to 0.010 inch, both extremely narrow for that length of time.

*Example 8*

Two groups of four seals each, made and cured from the same elastomeric composition as in Example 1, were tested on 10 to 18 R.M.S. races at 0.020 TIR runout. The first group of seals was treated at 350° F. for 4½ hours in a 6 ft. x 6 ft. x 6 ft. container. This first group was tested for 131 hours, the initial 4 hours in the absence of lubricant and the remaining 127 hours with a ½ inch head of 90 weight gear lubricant. The second group of seals was treated at 350° F. for 4 hours in the same container, and then run for 4 hours in the absence of lubricant, followed by 73 hours with a ½ inch head of 90 weight gear lubricant.

Since smoother races were used in this test, to investigate sealing lip wear, it was expected that the wear degree of these seals would be less than in Example 2. This was confirmed, since the seals of both groups had wear-pattern widths varying from 0.005 to 0.015 inch. Furthermore, all the seals ran dry.

*Example 9*

Three seals, made and cured from the same composition as in Example 1, were treated at 350° F. for four hours. To these three seals was added a fourth, untreated, identical seal and the four seals then run on 16 R.M.S. maximum races, initially for four hours without lubricant, followed by 58 hours with a ½ inch head of 90 weight gear lubricant. For the first 19 hours of the test, a 0.025 TIR runout was used, which then was reduced to 0.020 for the balance of the test. Although all seals were dry at the end of the test, the three treated seals had a maximum wear-pattern of from 0.010 inch to 0.015 inch, whereas the untreated seal had worn to 0.070 inch.

The tests set forth in the foregoing examples clearly illustrate the manyfold increase in abrasion-resistance imparted to nitrile-rubber seals by the process of this invention. That these treated seals may be expected to satisfactorily serve in actual use for a greatly extended period of time is indicated by maximum wear-pattern widths of 0.005 inch on the treated seals, compared to many times that on an untreated seal. Even if the shaft finish is substantially rougher than normal, the wear-pattern increases but moderately, as indicated in Example 4. Furthermore, an increased shaft runout does not increase leakage or wear on properly treated seals, as is indicated in Example 9.

The treatment of oil seals by the inventive process apparently results in a uniform, overall hardening of the rubber, as indicated (1) by observations of sealing member wear-patterns that have been produced by excessive shaft finishes, which observations indicate that no acceleration in wear occurs after the initial surface of the seal is destroyed, and (2) by microscopic examinations of the seal in cross-section which shows a continuity of physical structure.

It is interesting to note that this treatment seems to be peculiar to nitrile rubbers, for when it was tried on polyacrylic elastomers no appreciable increase in abrasion-resistance occurred. Furthermore, the abrasion-resistance of other types of Bunas was not increased, but these rubbers hardened well beyond the maximum permissible for an oil seal.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A process for improving the abrasion-resistance of completely cured elastomeric butadiene-acrylonitrile copolymers, comprising: subjecting the completely cured elastomer to a temperature of approximately 350° F. for a time interval of from 3 to 7 hours.

2. The process of claim 1, wherein the time interval is 4 hours.

3. The process of claim 1, wherein the time interval is 6 hours.

4. A process for rendering completely cured and finished butadiene-acrylonitrile elastomeric oil seals more resistant to the abrasive action of a rotating shaft, comprising: exposing the cured seals to a temperature of about 350° F. for 6 hours.

5. A method for manufacturing elastomeric oil seals with an abnormally high abrasion-resistance from a composition containing a butadiene-acrylonitrile copolymer, comprising: molding the composition into oil seals, press-curing the seal, removing the completely cured seal from the mold, trimming and otherwise finishing the seal, and then exposing the completely cured and finished seal to the effects of a temperature of about 350° F. for about 4 to 6 hours.

References Cited in the file of this patent

UNITED STATES PATENTS

| | | |
|---|---|---|
| 2,467,213 | Luaces | Apr. 12, 1949 |
| 2,467,214 | Luaces | Apr. 12, 1949 |
| 2,546,085 | Briscoe et al. | Mar. 20, 1951 |
| 2,565,063 | Briscoe et al. | Aug. 21, 1951 |
| 2,933,441 | Mallon | Apr. 19, 1960 |